United States Patent [19]

Yosida

[11] 4,236,189

[45] Nov. 25, 1980

[54] ENCLOSED SWITCHBOARD

[75] Inventor: Sizuo Yosida, Fuchu, Japan

[73] Assignee: Tokyo Shibaura Electric Company Limited, Kanagawa, Japan

[21] Appl. No.: 40,539

[22] Filed: May 21, 1979

Related U.S. Application Data

[63] Continuation-in-part of Ser. No. 860,169, Dec. 3, 1977, abandoned.

[30] Foreign Application Priority Data

Dec. 14, 1976 [JP] Japan .................................. 51-166736

[51] Int. Cl.³ ............................................. H02B 1/04
[52] U.S. Cl. .................................... 361/337; 361/343; 200/50 AA
[58] Field of Search ....................... 361/336, 337, 343; 200/47, 50 AA

[56] References Cited

U.S. PATENT DOCUMENTS

| | | | |
|---|---|---|---|
| 1,790,116 | 1/1931 | Sinclair et al. | 361/336 |
| 4,004,113 | 1/1977 | Ericson et al. | 200/50 AA |

Primary Examiner—Gerald P. Tolin
Attorney, Agent, or Firm—Oblon, Fisher, Spivak, McClelland & Maier

[57] ABSTRACT

In an enclosed switchboard in which a circuit breaker in a cubicle is drawn out from or pushed in toward a disconnecting switch, a controlling circuit housed in the cubicle for supplying a signal to the driving device of the circuit breaker and for transmitting a signal relating to the state of the circuit breaker to an external circuit. The controlling circuit is provided with a position switch which responds to the position of the circuit breaker, and two contactors which are constituted so as to be contacted with a contactor mounted on the circuit breaker in the connecting and the testing positions of the circuit breaker.

4 Claims, 6 Drawing Figures

ENCLOSED SWITCHBOARD

BACKGROUND OF THE INVENTION

The present application is a Continuation-In-Part of U.S. Application Ser. No. 860,169, filed Dec. 13, 1977 and now abandoned.

This invention relates to an enclosed switchboard, and more particularly to a controlling circuit thereof.

Generally, in an enclosed switchboard, a circuit breaker is housed in an enclosed cubicle to be movable therein, and a disconnecting switch is constructed so that it will be separated automatically from the circuit breaker when it moves.

The circuit breaker is usually located in three positions, i.e. a connecting position, a disconnecting position and a testing position along the movable direction of the circuit breaker.

Defining briefly these positions, the connecting position means a state which the circuit breaker is completely connected with the disconnecting switch and is connected with a controlling circuit. The controlling circuit housed in the cubicle is provided to supply a signal to the driving device of the circuit breaker and to transmit a signal relating to the state of the circuit breaker to an external circuit.

The disconnecting position means a state in which the circuit breaker is completely disconnected from the disconnecting switch.

The testing position means a state which the circuit breaker is separated from a stationary terminal constituting a part of the disconnecting switch at sufficient insulating distance and is only connected with the controlling circuit. Further in the testing position, the circuit breaker is able to make or break a connection in the main circuit through the controlling circuit and to make a sequence test in connection with another control system.

However, if the enclosed switchboard is applied to the advanced automatic control system in a power station or nuclear power station, there are many cases when above-mentioned function cannot be carried out.

In a prior enclosed switchboard, since the controlling circuit is completely separated from the circuit breaker when it is positioned in the disconnecting position (or is taken out of the switchboard for a check), the interlock against the outside is not included, and therefore such prior switchboard can not be used in the above-mentioned automatic system.

SUMMARY OF THE INVENTION

Accordingly, it is one object of this invention to provide a new and improved unique enclosed switchboard from which can be easily taken out a signal responding to the state of the circuit breaker on any connecting, disconnecting and testing position thereof.

According to the present invention, there is provided an enclosed switchboard of the type having a driving device for driving a circuit breaker and an auxiliary contact in a circuit breaker. The circuit breaker is housed movably in an closed cubicle and when the circuit breaker is moved, a movable contact of a disconnecting switch mounted on the circuit breaker contacts with or separates from a stationary contact of the disconnecting switch mounted on a frame in the cubicle. The improvement of the enclosed switchboard comprises a controlling circuit housed in the cubicle for supplying a signal to the driving device and for transmitting a signal relating to the state of the circuit breaker to an external circuit, a position switch housed in the cubicle for responding the position of the circuit breaker, a first pin mounted on the circuit breaker so as to cause the position switch to operate in response to the connecting position of the circuit breaker, a second pin mounted on the circuit breaker so as to cause the position switch to operate in response to the testing position of the circuit breaker, a first contactor mounted on the circuit breaker and connected with the auxiliary contact of the circuit breaker, a second contactor mounted on the cubicle so as to contact with first contactor when the circuit breaker is connected with the disconnecting switch, and a third contactor mounted on the cubicle so as to contact with first contactor when the circuit breaker is in the testing position of the circuit breaker.

BRIEF DESCRIPTION OF THE DRAWINGS

The other objects and advantages of the invention will be more readily understood from the following detailed description of a preferred embodiment thereof taken in conjunction with the accompanying drawings, in which.

DETAILED DESCRIPTION OF THE PREFERRED EMBODIMENT

Figure 1A:
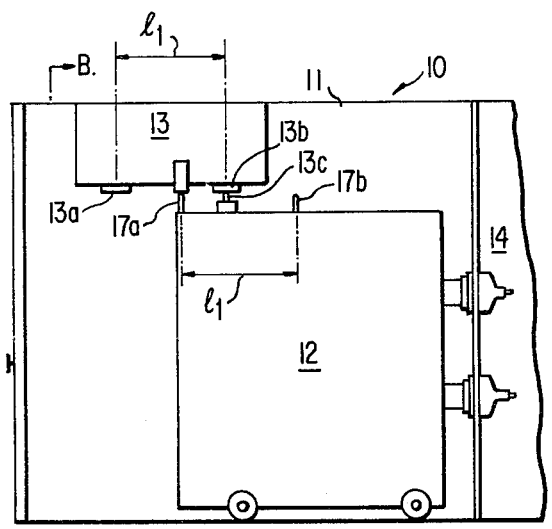
FIGS. 1a and 1b show a side view and a sectional view taken along the line B—B of FIG. 1a of an embodiment of the enclosed switchboard according to this invention.
Figure 1B:
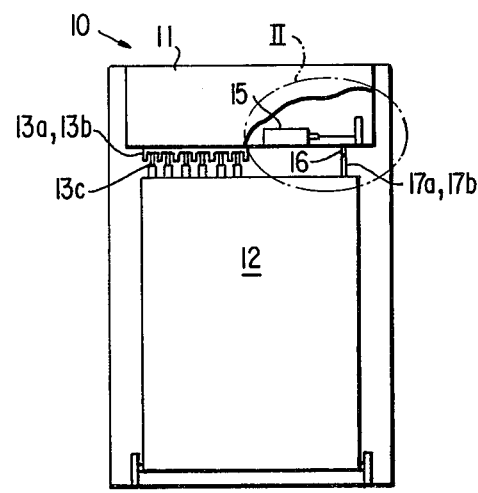

Referring now to the Drawings, wherein like reference numerals designate identical or corresponding parts throughout the several views, and more particularly to FIG. 1, an enclosed switchboard comprises a closed cubicle 10, a frame 11 mounted in the cubicle 10, a circuit breaker 12, housed movably in the cubicle 10, a controlling circuit housed in the cubicle for supplying a signal to the driving device of the circuit breaker 12 and for transmitting a signal relating to the situation of the circuit breaker to an external circuit (not shown) and a disconnecting switch 14.

The disconnecting switch 14 is constituted by a movable side terminal of the circuit breaker 12 and a stationary side terminal of the circuit breaker 12 facing the movable side terminal and mounted on the frame 11.

A controlling circuit 13, which supplies a signal to the driving device of the circuit breaker 12 and transmits signals relating to the position, i.e. a connecting position, a disconnecting position and a testing position of the circuit breaker 12 and the situation of the circuit breaker, has first and second stationary contactors 13a and 13b which are mounted on the frame 11 and aligned along the movement direction of the circuit breaker 12.

First and second stationary contactors 13a and 13b are provided so as to contact with a third contactor 13c mounted on the circuit breaker 12 when the circuit breaker 12 is connected with the disconnecting switch 14, i.e. it is in the connecting position and when the circuit breaker 12 is separated from the disconnecting switch and is located on the testing position of the circuit breaker, respectively.

A position switch 15 having a normally closed contact is mounted on the controlling circuit 13 and is engaged with a lever 16 to actuate the controlling circuit 13.

First and second pins 17a and 17b, which are mounted on the circuit breaker 12 facing the controlling circuit 13 are aligned along the movement direction of the circuit breaker 12, cause the normally closed contact of the position switch 15 to open by pushing up the lever 16 in the connecting position and the testing position of the circuit breaker, respectively.

Figure 2:
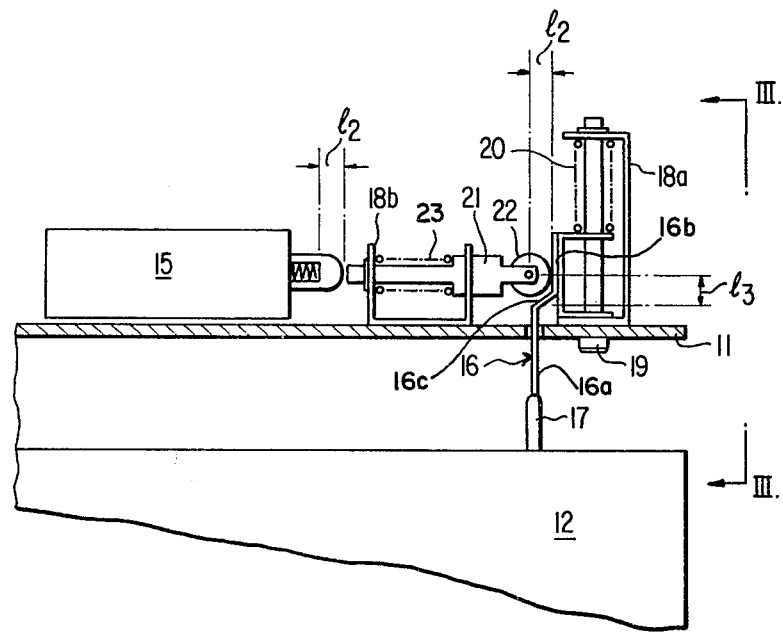
FIG. 2 is a front view of a part of a controlling circuit enclosed line II of FIG. 1b.
Figure 3:
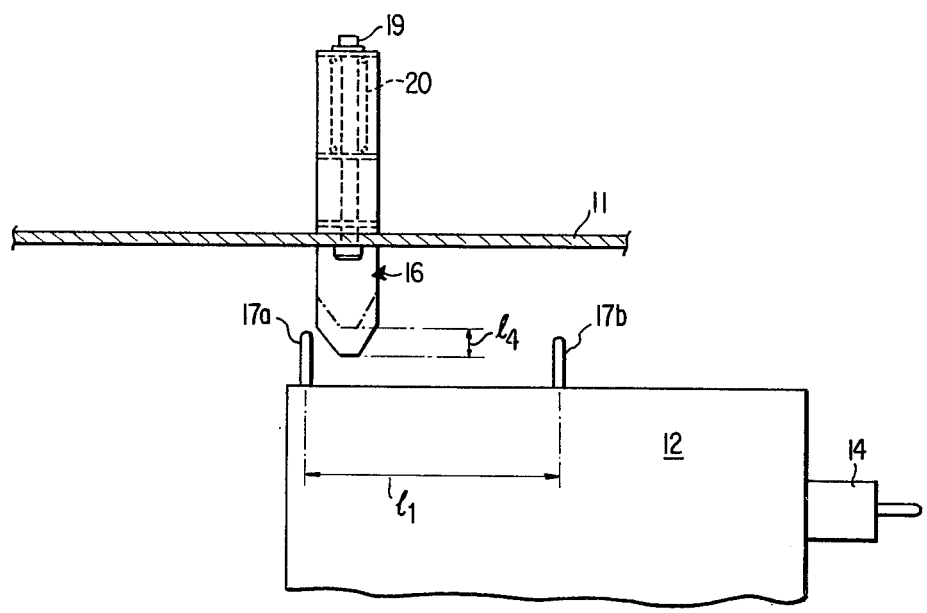
FIG. 3 shows a side view taken along the line III—III of FIG. 2 of the part of the controlling circuit.

Referring now to FIGS. 2 and 3, a detailed description of the position switch 15 and related elements is now provided. A guide frame 18a mounted on the frame 11 is engaged with the lever 16 slidable along a vertical pin 19 having a head. The lever 16 is mechanically biased by means of a compressed vertical spring 20. Pressing against the lever 16 is a roller 22 which is coupled to one end of a horizontal pin 21 mounted within a guide frame 18b. Mechanically biasing the roller 22 against the lever 16 is a compressed horizontal spring 23. Another end of the horizontal pin 21 is engaged with the position switch 15.

When the circuit breaker 12 is moved to the connecting position and the testing position, the lever 16 is pushed up by the pin 17 forcing the horizontal pin 21 through the coupling provided by roller 22, to experience a horizontal displacement stroke $l_2$. The displacement $l_2$, is transmitted to the position switch 15, resulting in actuation of position switch 15.

Stating the dimension of each part of the position switch 15, the lever 16 is provided with flat portions 16a and 16b, separated by a stair bending part 16c, constituted so as to coincide with the effective stroke $l_2$ of the position switch 15. In a pushing up of the lever 16, assuming that a vertical distance which the lever 16 is pushed up by the pin 17a is $l_4$ and that a vertical distance through which the lever 16 is moved until the roller 22 is completely run onto the part of the lever 16 is $l_3$, the relationship between the circuit breaker 12 and a contacting part of the enclosed switchboard is adjusted by assembly tools so that the dimension $l_3$ is always smaller than the dimension $l_4$. The moving length $l_3$ of the lever 16 is preferably the same as the effective stroke $l_2$.

Namely, $l_3$ is selected such that any tolerance error between the circuit breaker and the contacting part of the enclosed switchboard is absorbed by overstroking the dimension $l_4$ whereby the effective displacement of pin 21 is maintained at $l_2$.

On the other hand when the circuit breaker 12 is moved from the connecting position to the testing position thereof, the operation of the position switch 15 in which the lever 16 is pushed up by the pin 17b is similar.

Figure 4:
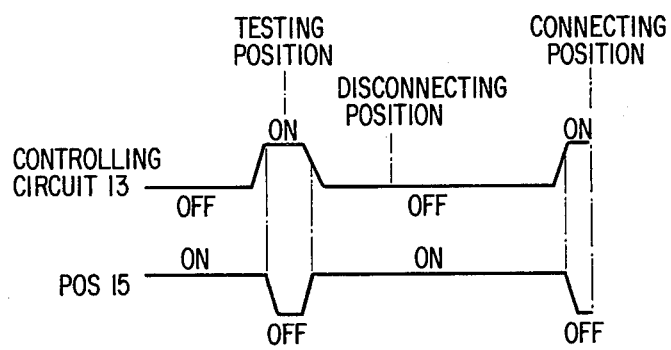
FIG. 4 is a sequence chart showing the relationship between the controlling circuit and the position switch in response to each position of the circuit breaker.
Figures 5A, 5B, 5C:
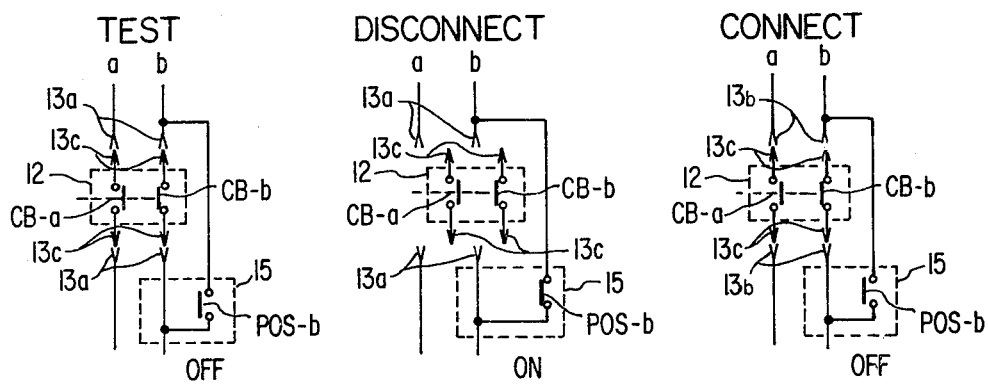
FIGS. 5a, 5b and 5c are a sequence chart showing a connecting relationship of the testing the disconnecting and the connecting position of the circuit breaker; and respectively.

Stating the relationship between the operations of the controlling circuit 13 and the position switch 15 in reference to FIG. 4, the controlling circuit 13 is turned ON in the connecting and testing positions and the position switch 15 is turned OFF in the same positions. Referring to FIG. 5a, b and c, and FIG. 6, the circuits in the testing, the disconnecting and the connecting position of the circuit breaker 12 are shown therein. It is possible to communicate with the contact signal of the circuit breaker 12 because the position switch POS-b is turned OFF in the testing position as shown in FIG. 5a so that the sequence test can be carried out.

Figure 6:
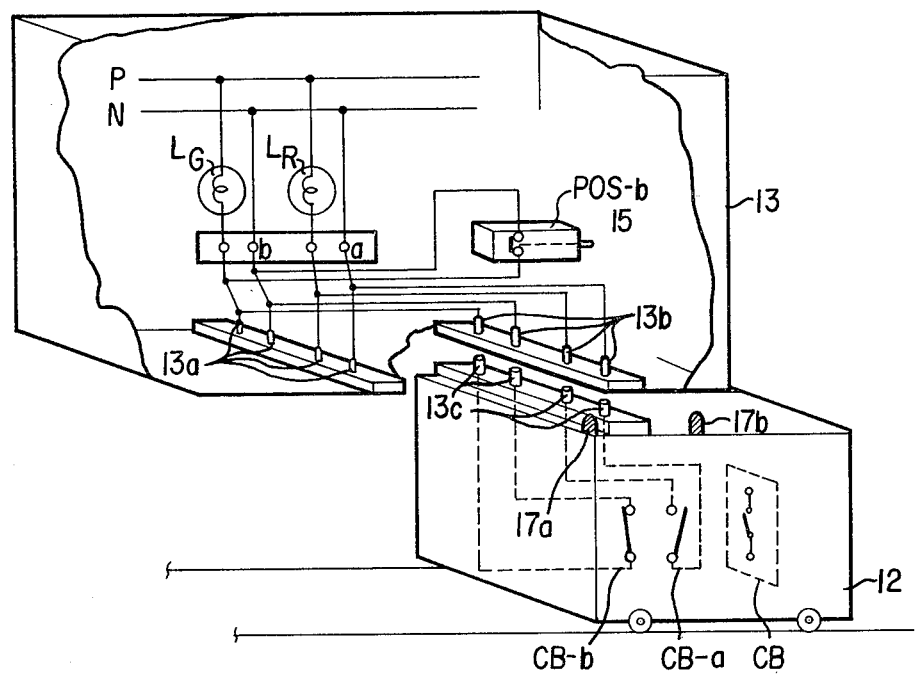
FIG. 6 shows another view of the enclosed switchboard of FIG. 1 including the enclosed circuitry.

Referring now to FIG. 1, FIG. 5a, b and c, and FIG. 6, the relationship of the contactors 13a, 13b, 13c and the circuit breaker 12 is now described. Firstly, it is noted that circuit breaker 12 is conventionally provided with an auxiliary contact, defined by a pair of individual respectively normally open and normally closed contacts CB-a and CB-b. As shown in FIG. 5a, b, c, and in FIG. 6, contacts CB-a and CB-b are wired in series with selected contactors 13c. Contactors 13a, 13b on the other hand are shown wired to lines a, b, which are likewise located in the controlling circuit 13. Thus it is understood that contactors 13a and 13b are wired in parallel while the lines a, b can be connected to the contacts CB-a, CB-b through the connections of either of contactors 13a, or 13b to contactor 13c in the testing or connecting positions, respectively.

It is possible to take out a signal as to interlock condition from the position switch via the lines a, b shown in FIG. 5a, b, c, and in FIG. 6, since the position switch 15 is turned ON in disconnecting position as shown in FIG. 5b even if contactor 13a–13c or 13b–13c of the controlling circuit 13 is open.

In the connecting position as shown in FIG. 5c, and FIG. 6 since the position switch 15 is turned OFF whereby it goes into a similar state to the above-described testing state, the operation of the enclosed switchboard will be carried out without difficulty.

It should be apparent that in accordance with the teachings of the present invention that it is possible to take out a signal responding to the open and closed state of the circuit breaker even if the accomodated circuit breaker is placed in any connecting, disconnecting and testing position thereof.

The lines "a" and "b" are connected to the contactors 13a and 13b. When in the test position, the lines a, b are respectively connected to the auxiliary contacts CB-a, CB-b by means of interconnection between contacts 13a and 13c. Similiary, when in the connected position, lines a, b are connected in series with the auxiliary contacts CB-a, CB-b, respectively, by means of the interconnection of contactors 13b and 13c. However, when operation is in the disconnect position, neither of contactors 13a or 13b are connected to contactors 13c such that the connection of the lines a, b to the auxiliary contacts CB-a, CB-b is open. Nevertheless, according to the invention, the POS-b switch which is wired across opposed contactors 13a, 13b is closed during operation in the disconnect position to complete otherwise disconnected segments of the line "b". Under these circumstances during operation in the disconnect position, the circuit breaker according to the invention is thereby provided with an interlocked capability.

The word "Interlock" means that when a first circuit breaker is tripped by the fault, such as a ground fault of the first circuit breaker, a second circuit breaker is thrown in provided that a fault detecting signal and a closed signal of the b-contact of the first CB exist.

In addition, the second CB does not throw in due to a closed state of a contact of the first CB when the first CB is normal.

However, when the first CB is tripped by the fault the second CB can be thrown in provided that a closed state of b contact of the first CB and a throw-in signal to the second CB exist.

According to this invention, even if the circuit breaker is placed in any position, particularly in the disconnecting position of the cubicle, another circuit breaker can be thrown in since the state of the position switch 15 connected in parallel with the b contact of the first CB as shown in FIG. 5b is the ON state.

The word "sequence test" means that, for example, it is to check as to whether each of the circuit breakers is normally operated on each testing position with or without actual operations.

Since it is possible to carry out the sequence test in the testing position by only drawing out the circuit breaker from the connecting position to the testing position, it eliminates the difficulties of the past switchboard and there is eliminated the inconvenience when the operating miss of the position switch releasing device occurs.

It is an advantage that the switchboard is manufactured at low cost since the switchboard is simple.

Obviously numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An enclosed switchboard comprising:
   a closed cubicle;
   a circuit breaker housed movably in the closed cubicle and having driving means for driving the circuit breaker and an auxiliary contact;
   a frame mounted in the cubicle;
   a disconnecting switch having a stationary contact mounted on the frame and a movable contact mounted on the circuit breaker; whereby when the circuit breaker is moved the movable contact contacts or separates from the stationary contact;
   actuable controlling circuit means housed in the cubicle for supplying a signal to the driving means and for transmitting a signal relating to the state of the circuit breaker to an external circuit;
   a position switch housed in the cubicle for responding the position of the circuit breaker;
   a first pin mounted on the circuit breaker so as to cause the position switch to operate in response to the connecting position of the circuit breaker for actuating the controlling circuit means;
   a second pin mounted on the circuit breaker so as to cause the position switch to operate in response to the testing position of the circuit breaker for actuating the controlling circuit means;
   a first contactor mounted on the circuit breaker and connected with the auxiliary contact of the circuit breaker;
   a second contactor mounted on the cubicle so as to contact with the first contactor when the circuit breaker is connected with the disconnecting switch; and
   a third contactor mounted on the cubicle so as to contact with the first contactor when the circuit breaker is located on the testing position of the circuit breaker.

2. An enclosed switchboard according to claim 1 wherein said first and second pins are spaced and aligned along the movement of the circuit breaker.

3. An enclosed switchboard according to claim 1 wherein said second and third contactor are mounted on the controlling circuit and are aligned along the movement of the circuit breaker.

4. An enclosed switchboard according to claim 1 wherein said first contactor on the circuit breaker contacts with second contactor when the position switch is operated by first pin, and said first contactor contacts with third contactor when the position switch is operated by second pin.

* * * * *